(12) United States Patent
Ludwig

(10) Patent No.: US 6,765,889 B1
(45) Date of Patent: Jul. 20, 2004

(54) COMMUNICATION METHOD AND SYSTEM

(75) Inventor: Reiner Ludwig, Hürtgenwald (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/114,281

(22) Filed: Jul. 13, 1998

(30) Foreign Application Priority Data

Jul. 14, 1997 (DE) .......................................... 197 30 159

(51) Int. Cl.[7] .......................... H04Q 7/00; H04L 12/54; H04L 12/56; H04L 1/00
(52) U.S. Cl. ...................... 370/331; 370/428; 370/394; 370/237; 370/252
(58) Field of Search ................................ 370/450, 447, 370/448, 445, 459, 461, 462, 331–333, 428, 216, 231, 394, 235, 236, 230, 230.1, 237, 252, 465, 469; 455/436–444

(56) References Cited

U.S. PATENT DOCUMENTS

| | | | | |
|---|---|---|---|---|
| 5,479,409 A | * | 12/1995 | Dupuy et al. ............... | 370/337 |
| 5,613,203 A | * | 3/1997 | Dupuy et al. ............... | 455/436 |
| 5,711,003 A | * | 1/1998 | Dupuy ....................... | 455/436 |
| 5,901,140 A | * | 5/1999 | Van As et al. .............. | 370/236 |
| 5,987,018 A | * | 11/1999 | Freeburg et al. .......... | 370/310.2 |
| 6,028,853 A | * | 2/2000 | Haartsen ..................... | 370/338 |
| 6,052,372 A | * | 4/2000 | Gittins et al. ............... | 370/396 |
| 6,052,594 A | * | 4/2000 | Chuang et al. ............. | 455/450 |
| 6,076,113 A | * | 6/2000 | Ramanathan et al. ....... | 709/235 |
| 6,125,281 A | * | 9/2000 | Wells et al. ................. | 455/466 |
| 6,151,300 A | * | 11/2000 | Hunt et al. .................. | 370/231 |
| 6,240,083 B1 | * | 5/2001 | Wright et al. ............... | 455/426 |

FOREIGN PATENT DOCUMENTS

| | | |
|---|---|---|
| EP | 0 695 053 | 1/1996 |
| WO | WO98/38808 | 9/1998 |

OTHER PUBLICATIONS

"Der Fernmelde–Ingenieur", 41.Jahrgang/Heft 5, Mai 1987.

"Requirements for mobility support in ATM", L. Van Hauwermeiren et al., 0–7893–1820–X/94 IEEE, 1994.

"Handover in a micro–cell packet switched mobile network", Reuven Coben et al., Wireless Networks 2 (1996, pp. 13–25 J.C. Balzer AG, Science Publishers).

"Introduction to TCP/IP", http://pclt.cis.yale.edu/pclt/comm/tcpip.htm, Feb. 2, 1995.

(List continued on next page.)

*Primary Examiner*—Seema S. Rao
*Assistant Examiner*—Ron Abelson

(57) ABSTRACT

Communication method and system for transmitting data partitioned into a plurality of data packets between at least two communication units (CU1, CU2, CU4) using a communication network (N). During temporary interruptions of transmission of data packets via the communication network some of the transmitted data packets are lost. The invention allows to avoid the loss of data packets due to temporary interruptions of the communication network by determining at the sending data processing device, based on information received from the communication network, which data packets are lost or will be lost during transmission due to a temporary interruption of the communication network. The method can be used for data transmission via mobile communication networks and an "Internet". To allow a retrieval of lost data packets, data packets scheduled for transmission can be temporarily stored in a temporary storage devices. Transmission of packets, retransmission and other services needed for data communication can be performed by an appropriately modified TCP/IP protocol set.

26 Claims, 7 Drawing Sheets

OTHER PUBLICATIONS

"What is TCP/IP", Charles L. Hendrick, 1987, http://oac3.hsc.uth.tmc.edu/staff/snetwon/tcp–tutorial/sec.1.html.

"General description of the TTP/IP protocols", Charles L. Henderick, 1987, http://oac3.hsc.uth.tmc.edu/staff/snetwon.tcp–tutorial/sec.1.html.

"Lexikon der Kommunikations– und Informationstechnik", Niels Klussmann, Hütig Verlag 1997, Heidelberg, ISBN 3–7785–2543–3 pp. 250–255 and p. 464, 1997.

"Improving reliable transport and handoff performance in cellular wireless networks", H. Balakrishnan et al., Wireless Networks, vol. 1, No. 4, Dec. 1, 1995, pps. 469–481—XP000543510.

"PDAs as mobile WWW browsers", S. Gessler et al., Computer Networks and ISDN Systems, vol. 28, Dec. 1, 1995, pps. 53–59—XP002037371.

* cited by examiner

COMMUNICATION METHOD AND SYSTEM

FIELD OF INVENTION

The present invention relates to a communication method and system for transmitting data between data processing devices via a communication network.

TECHNICAL BACKGROUND AND PRIOR ART

The exchange of data between data processing devices is becoming increasingly popular and widespread in work environments as well as for private use. Services and applications, as for example "email" (electronic mail) and remote data base research, applications using an "Internet" and the like are well known. These applications are designed to make use of networks of computers, connected to each other via communication links for exchanging application related data. The exchange of data between data processing devices or computers, respectively, via the network is usually facilitated by specific rules or communication protocols, mainly implemented in software, which assure the execution of the same prespecified processing steps for data transmission at the sending as well as at the receiving computer.

For exchanging data, data processing devices or computer of a network do not necessarily have to be connected by fixed communication lines, communication can be conducted via temporary links and indirect links, respectively, and, in networks different types of data transmission may be combined.

Two basic techniques for communication via a network or a network of networks may be distinguished: Firstly, data can be transmitted via a switched or direct communication line, respectively, e.g. used in a telephone network. This first technique is also termed circuit switched transmission. Secondly, data can be transmitted in small chunks or packets, which are all individually routed to the recipient via the network, possibly on different paths and with different transmission times. This technique is also termed packet switched transmission. For packet switched transmission of information, communicating devices do not have to be connected directly, since the packets of information are transmitted in the network in steps between usually several nodes of the network, which may intermediately store the packets before further transmission. However, it is required for both, circuit switched transmission and packet switched transmission, that prespecified rules or protocols for data exchange are mutually obeyed by the sending and the receiving data processing device. As mentioned before, both techniques may be used in combination, e.g., in compound networks.

A large variety of networks of data processing devices exists, usually designed for specific applications and environments. For example, local area networks are used for smaller communities such as company sites or university campuses, whereas wide area networks are used for connecting computers over larger distances or local area networks amongst each other.

A well known and widely used network is the so-called "Internet", connecting data processing devices via a network of interlinked nodes virtually all over the world. An essential characterizing feature of the "Internet" is the use of a set of common rules or protocols for transmitting and receiving data at data processing devices via communication links of various types.

Subscribers of "Internet" services often connect their personal computer via a regular telephone line to an access node of the "Internet", in order to establish a link to the network. Usually, this involves connecting the computer via a modem to the telephone line, to dial a prespecified number to access the nearest node of the network and to perform certain access and security routines. After the subscriber is connected to the network, data communication between the subscriber's computer and the access node or any another computer of the network via the access node can be easily performed using various application programs.

The actual communication is handled by a set of protocols and largely remains invisible to the user. Such sets of communication protocols, also termed protocol suites, used for exchanging data between data processing devices are usually hierarchically layered, which each layer performing a certain task, from high level communication commands down to the actual management of the physical medium used for transmitting data. Tasks include, for example, partitioning a message into individual data packets, scheduling the packets for transmission, generating signals corresponding to the data of the packets suitable for transmission over the used communication link and the like.

A widely used protocol suite for "Internet" applications for exchanging data between data processing devices is the so-called TCP/IP protocol suite. TCP/IP was initially developed to connect a number of different networks designed by different vendors into a network of networks, the "Internet". TCP/IP delivers some basic services frequently needed for data exchange between data processing devices, such as file transfer, electronic mail and remote logon. The set of protocols is responsible for guaranteeing that data reach the designated recipient. The protocols keeps track of data sent and retransmit anything that did not arrive properly. If a message is too large for transmission in a single packet, e.g., the text of a message, it is split up into several packets and subsequently those packets are scheduled for transmission.

If packets of data are transmitted in a network, as described above, the communication link does not require a permanent connection, since all packets are sent individually with individual headers containing address and recipient information. It is perfectly possible that packets of the same message are transmitted via different physical paths and arrive at different times, even in reversed order.

However, it is possible, that the communication network does not only use a physical medium suited for packet switched transmission, e.g., networks using direct lines may be included, as outlined before. In the following therefore a case is considered, where the communication link includes a mobile communication network. It be assumed, that a computer is connected to a network via a mobile station and a mobile communication link and the data packets exchanged with another computer are therefore transmitted via said mobile station.

This example is further illustrated in FIG. 7 showing a known communication system. In FIG. 7, a first data processing device C1 is connected to a second data processing device C2 via a communication network CN, an interface I and an "Internet". Due to the nature of the communication network, it can occur that some data packets are lost during transmission due to states of the communication network. For example, during handover procedures between two base stations of the mobile communication network, the communication line is temporarily interrupted for a short period of time of 50 to 300 ms. Although this does not significantly degrade the quality of transmitted speech, however, the loss of data packets being sent during the short interruption of the network, can trigger certain reactions of a data processing device, controlled by the particular protocols used, which are responsible for data transmission. This can significantly degrade the overall data transmission speed.

For example, the TCP/IP protocol suite incorporates an avoidance algorithm and an algorithm for congestion control which may be triggered by the loss of packets due to temporary interruptions of the communication network. Thus, the effects of a handover procedure of a communication link in the mobile communication network may be misinterpreted as the occurrence of congestion and may trigger algorithms designed to cope with network congestion and which degrade the application data throughput unnecessarily.

DISCLOSURE OF INVENTION

It is therefore object of the present invention to provide a communication method and system for improved transmission rate of data packets transmitted between data processing devices via a communication network.

According to one aspect of the invention, the communication method of the invention for transmitting a plurality of data packets between at least two communication units (CU1, CU2, CU4) via a communication network (N) includes the steps of: a) scheduling said data packets into a sequence for transmission at a first communication unit (CU1 or CU2 or CU4), b) sending said data packets to a second communication unit (CU2 or CU4 or CU1) via the communication network (N), c) determining, at the first communication unit (CU1 or CU2 or CU4), which data packets were lost or will be lost during transmission due to a temporary interruption of the communication network (N), based on information received form the communication network, and d) transmitting said data packets determined to be lost at a later point in time.

According to another aspect of the invention, the communication method for transmitting a plurality of data packets between at least two communication units (CU1, CU2, CU4) via a communication network (N) includes the steps of: a) scheduling said data packets into a sequence for transmission at a first communication unit (CU1 or CU2 or CU4), b) sending said data packets,to a second communication unit (CU2 or CU4 or CU1) via the communication network (N), c) determining, at the first communication unit (CU1 or CU2 or CU4), which data packets were lost or will be lost during transmission due to a temporary interruption of the communication network (N), based on information received from the communication network, including generating an interrupt message (IM) at a network node (N1, N2, MS) indicating a time period during which the communication link via the communication network (N) is temporarily interrupted; receiving said interrupt message (IM) at the first communication unit (CU1 or CU2 or CU4); and processing the interrupt message (IM) to determine data packets, which were transmitted or will be transmitted during said period, and d) retransmitting said data packets at a time after the time period indicated in the interrupt message (IM).

According to another aspect of the invention, the communication system comprises: a first communication unit (CU1 or CU2 or CU4), formed by a first data processing device (C1 or C2 or C4) and first transmission control means (T1 or T2 or T4); a second communication unit (CU2 or CU4 or CU1), formed by a second data processing device (C2 or C4 or C1) and second transmission control means (T2 or T4 or T1); a communication network (N) for transmitting data partitioned into a plurality of data packets from said first communication unit (CU1 ox CU2 or CU4) to said second communication unit (CU2 or CU4 or CU1); wherein said first transmission control means (T1 or T2 or T4) are arranged to determine data packets which were lost or will be lost during transmission, based on information received the communication network (N), and transmits said data packets determined to be lost to the second communication unit (CU2 or CU4 or CU1) at a later point in time.

According to another aspect of the invention, the communication system comprises: a first communication unit (CU1 or CU2 or CU4), formed by a first data processing device (C1 or C2 or C4) and first transmission control means (T1 or T2 or T4); a second communication unit (CU2 or CU4 or CU1), formed by a second data processing device (C2 or C4 or C1) and second transmission control means (T2 or T4 or T1) ; a communication network (N) for transmitting data partitioned into a plurality of data packets from said first communication unit (CU1 or CU2 or CU4) to said second communication unit (CU2 or CU4 or CU1); interrupt message means (N1, N2, MS, BTS, BSC, MSC) for generating an interrupt message (IM) indicating a time period during which a transmission via the mobile communication network is temporarily interrupted due to a handover procedure or other temporary interruptions; and wherein said first transmission control means (T1 or T2 or T4) are arranged to determine data packets which were lost or will be lost during transmission, based on information received the communication network (N), and transmits said data packets determined to be lost to the second communication unit (CU2 or CU4 or CU1) at a later point in time.

The method and system according to the invention therefore allows to determine data packets or groups of data packets which were lost or will be lost during transmission due to a temporary interruption of the communication link, established via the communication network, based on information received from the communication network, and allow to transmit said data packets or groups of packets at a later time.

A further advantageous embodiment of the invention allows to intermediately store data packets scheduled for transmission in a temporary storage means.

Further, packets which were lost or will be lost during transmission may be identified based on an interrupt message received at a data processing device from the communication network indicating a time period during which the communication link via the communication network is temporarily interrupted. This allows an efficient handling of packet transmission in the presence of a temporary interruption.

In yet another advantageous embodiment of the invention, based on the identification of data packets which were lost or will be lost during transmission, packets can be conveniently retrieved from said temporary storage means and transmitted at a later point in time. As an alternative, the transmission of data packets can be temporarily interrupted, if the information obtained from the communication network about the temporary interruption or interrupt message, respectively, was received before or during the temporary interruption of the network.

The interrupt message can advantageously include a time stamp, execution time, execution time offset and an execution delay parameter for allowing an efficient handling of packet transmission in the presence of a temporary interruption.

Further, the communication system can include a mobile communication network and the interrupt message indicating said period of time of temporary interruption of the network can be generated at a mobile station or a network node of said mobile communication network.

In still another advantageous embodiment of the present invention the mobile communication network can be a GSM network and the message indicating the period during which the transmission link via the communication network is temporarily interrupted can be sent at the same time as a handover command, used in GSM systems for initiating a handover procedure of the communication link between two network nodes.

In yet another advantageous embodiment the communication of data packets between data processing devices can include transmission via an "Internet" network, connecting a plurality of data processing devices.

Further advantages and improvements of the invention can be found in the dependent claims.

DESCRIPTION OF FIGURES

The invention can be more fully understood if seen in conjunction with the following figures.

DETAILED DESCRIPTION OF EMBODIMENTS

In the following an embodiment of the invention is described with respect to FIG. 1.

Figure 1:
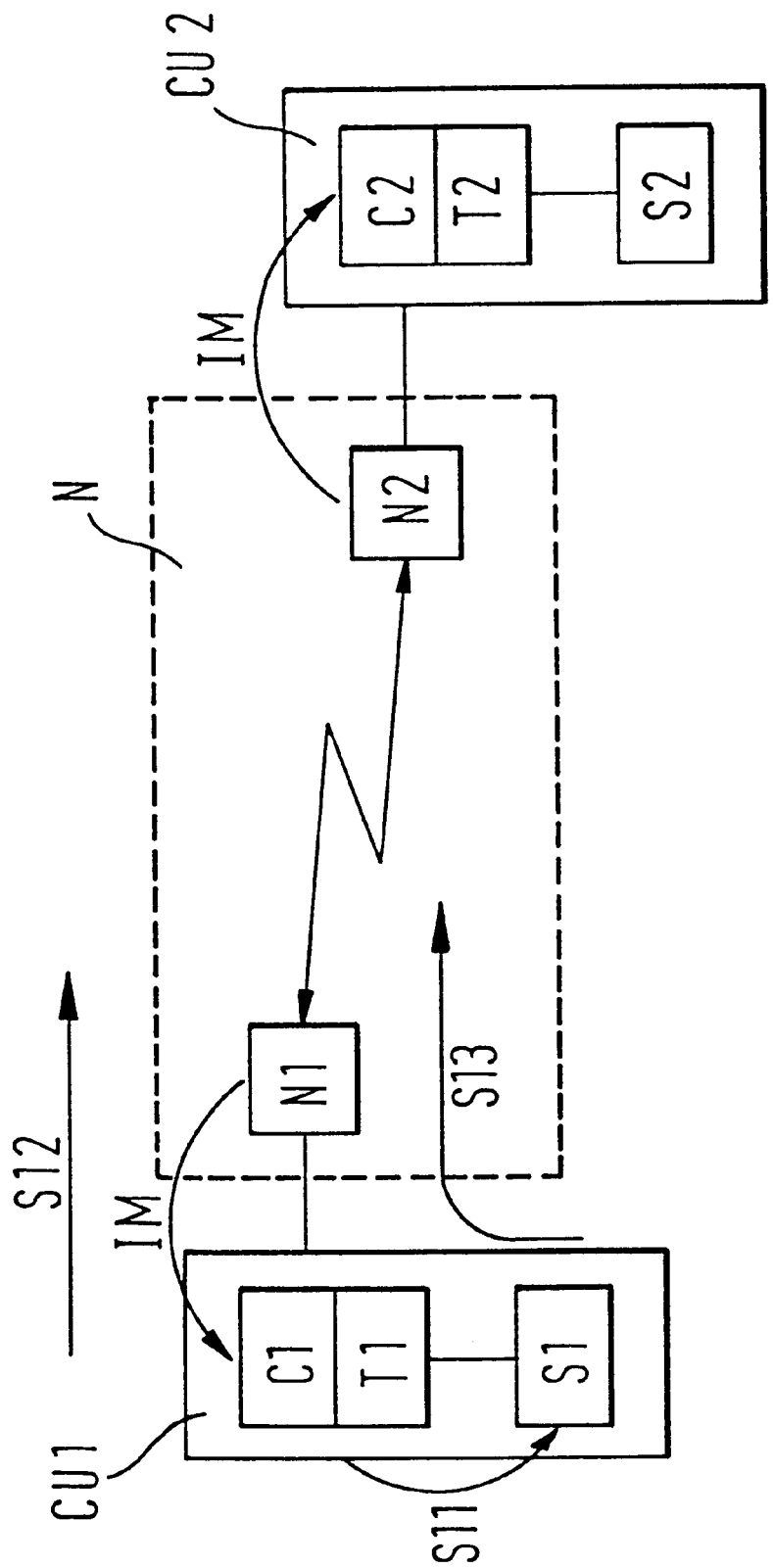
FIG. 1 illustrates an embodiment of the communication system according to the present invention.

FIG. 1 shows an embodiment of the communication system according to the present invention. Arrows included into the figure illustrate steps for transmitting data packets according to the communication method according to the present invention. The embodiment shown in FIG. 1 includes two data processing devices C1, C2, connected to each other via a communication network N comprising two network nodes N1, N2. The first and second data processing devices may be state of the art personal computers, provided with input means, viewing screen and data modems.

Said network nodes N1, N2 are connected to each other via a communication link, indicated by a double arrow. The communication link can include fixed communication lines as well as wireless communication links. Even though only two network nodes are shown, the communication network N can include a plurality of network nodes and, moreover, can be composed of sub-networks using different data transmission methods, interconnected via interfaces.

The first data processing device C1 is connected to first transmission control means T1. Further, the first data processing device C1 is connected to first temporary storage means S1 for temporary storing data related to the transmission of messages. The first data processing device C1, the first transmission control means T1 and the first temporary storage means S1 form a first communication unit CU1 for exchanging data via the communication network N. Analogously, the second data processing device C2 is connected to second transmission control means T2 and second temporary storage means S2, which forms a second communication unit CU2 for exchanging data via the communication network N.

The communication system according to the invention does not always require temporary storage means S1 and S2. For example, if no temporary storage of data related to the transmission of messages is needed, e.g., as later described with respect to FIG. 4, temporary storage means are not provided. In this case, the first and second communication units CU1 are respectively constituted only by the first and second data processing devices C1, C2 and the first and second transmission control means T1, T2. Further, even though the embodiment of FIG. 1 comprises only two data processing devices, in other embodiments a plurality of data processing devices may be connected to the network nodes N1 and N2, and in this case any of the data processing devices can communicate with the remaining data processing devices.

The illustrated embodiment of the communication system according to the invention is arranged for transmission of data divided into data packets. Each of the data packets is individually provided with a header, e.g., containing recipient and address information for allowing the data packet to be safely delivered via the communication network N to the receiving data processing device. Usually, a message is partitioned into one or more data packets before transmission and upon reception of the data packets and the receiving data processing device the packets are assembled to obtain the original message. The procedures for partitioning the message into data packets, the transmission of the individual data packets using header information contained in the packets and the reassembling of the data packets at the receiving data processing device is usually handled by a set of communication protocols, as outlined earlier in detail. The set of protocols may be the TCP/IP protocol suite or any other set of protocols.

In the following the operation of the communication system and method according to the embodiment of the invention illustrated in FIG. 1 is described. It is assumed, that data packets related to a message are to be transmitted from the first data processing device C1 to the second data processing device C2.

In a first step, the data packets are scheduled into a sequence of packets for transmission from the first communication unit CU1. The message itself and/or the data packets may have been generated at the first data processing device C1 or may have been received from another device (not shown).

In a second step, the data packets scheduled for transmission are sent via the communication network nodes N1, N2 toward the second data processing device C2, as indicated in FIG. 1 by the arrow denoted S12. Steps for transmitting the data packets, i.e., the execution of the rules for data transmission according to the protocols, are preferably performed by the first transmission control means T1. Before transmission, said data packets may be temporarily stored in the temporary storage means S1 connected to the first data processing device C1, as indicated by the arrow denoted S11. This assures, that data packets are still available at the first data processing device C1 and the first transmission control means T1 for a certain time period after transmission.

Even though the data packets have been correctly sent from the first communication unit CU1 towards the second data processing device C2 via the network N, it is not assured that all data packets will actually arrive at the second data processing device C2. Data packets may be lost during transmission for a variety of reasons. Since each packet is sent via the network individually, if certain network statuses occur, some of the data packets may be discarded at network nodes or otherwise be lost. For example, as outlined before, if for short periods of time the connection via the communication network between the first network node N1 and the second network node N2 is interrupted, those packets or groups of data packets will be lost, which are transmitted via the communication network N during said temporary interruption.

Therefore, in accordance with the communication method according to the invention, in a third step, it is determined at the first communication unit CU1, preferably by the first transmission control means T1, which data packets or which group of data packets was lost or will be lost during transmission due to a temporary interruption of the communication network N. This determination is based upon information received from the communication network N concerning certain system status.

In a fourth step said data packets or groups of data packets determined to be lost are retransmitted later in time, after the transmission link between first and second communication unit CU1, CU2 via the communication network N is reestablished. The retransmission of data packets is preferably performed by the transmission control means T1 by retrieving and transmitting said data packets or groups of data packets stored in the first temporary storage means S1. Thus, it should be assured that data packets scheduled for transmission are temporarily stored in the temporary storage means S1 for a period of time which is long enough that packets will not be deleted from the temporary storage means S1 before a retransmission of said data packets or groups of data packets determined to be lost during transmission can be performed. In the described embodiment of the invention, a time period of 3000 ms is an appropriate time frame for fulfilling the above requirement, however, in other embodiments of the invention time periods with different duration may be required or sufficient.

In a further embodiment according to the invention, the transmission of data packets may also be temporarily interrupted. Such a temporary interruption of the transmission of data packets is preferably performed by said first transmission control means T1 upon reception of said information from the network concerning the temporary interruption of the communication link, however, only if said information is received at the first communication unit CU1 before or during said temporary interruption of the network.

The communication method according to the invention has above been described for a transmission of data packets from the first data processing device to the second data processing device via the communication network. Since the transmission of data packets in the opposite direction follows analogous steps, however, a description of a transmission of data packets from the second data processing device C2 towards the first data processing device C1 is not required and therefore omitted.

In another embodiment of the invention, information received at the first or second communication unit CU1, CU2 from the network regarding system status indicating a temporary interruption of transmission may be sent as an interrupt message IM. This interrupt message may be sent from one of the network nodes N1 or N2 to the respective one of the first and second communication unit CU1, CU2. The transmission of the interrupt message IM is illustrated in FIG. 1 with the arrow denoted IM.

The interrupt message IM may contain detailed information about the occurrence of temporary interruptions of the communication link, which already occurred in the past, is presently occurring or will occur in the future. Also, the interrupt message IM may contain parameters indicating periods of time when a transmission of data packets from one of the data processing devices C1, C2 could be interrupted in order to avoid a loss of data packets, as described above.

In the following another embodiment of the invention is described with respect to FIG. 2.

Figure 2:
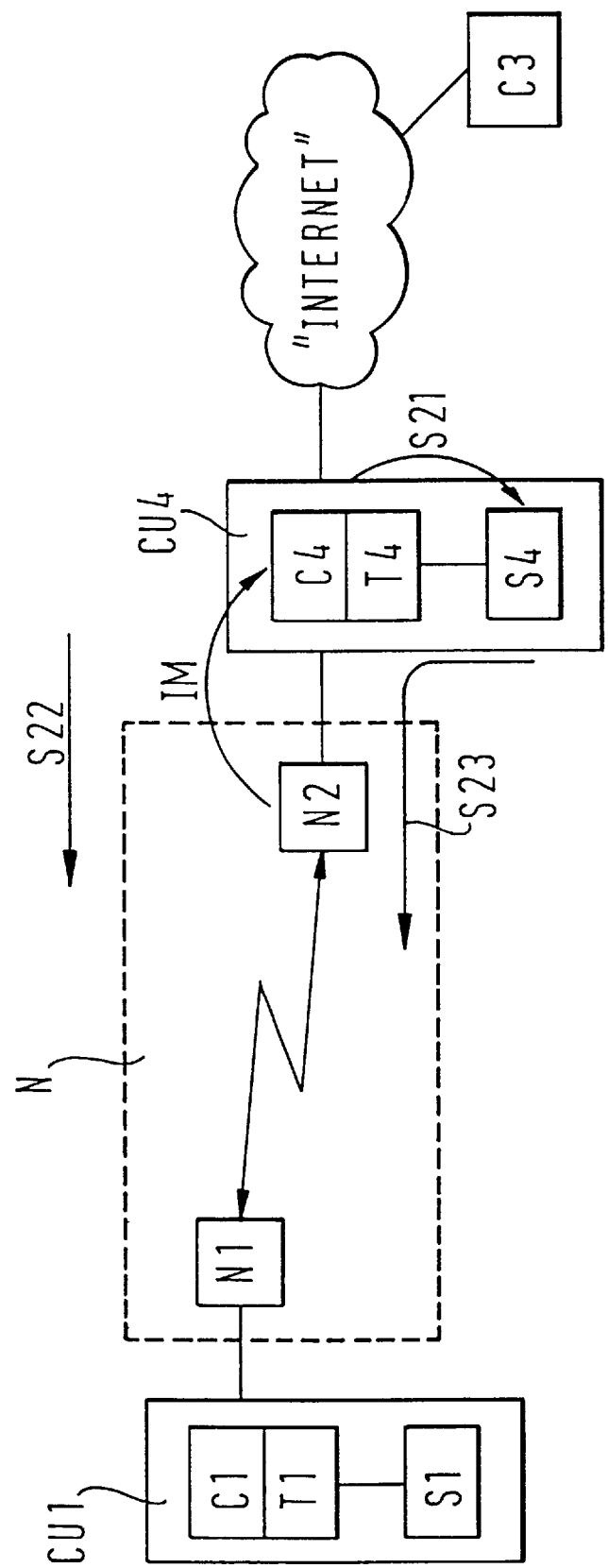
FIG. 2 illustrates another embodiment of the communication system according to the invention.

FIG. 2 shows a system for performing the communication method according to the invention. In the arrangement shown the first communication unit CU1, formed by said first data processing device C1, said first transmission control means T1 and first temporary storage means S1, is arranged to exchange data packets with a third data processing device C3. The first communication unit CU1 is shown to be connected to a fourth communication unit CU4, formed by a fourth data processing device C4, fourth transmission control means T4 and fourth temporary storage means S4 via the communication network N containing said network nodes N1, N2. It is noted, as described with respect to FIG. 1, the first and fourth temporary storage means S1, S4 may not be required in other embodiments an may be omitted.

The fourth communication unit CU4 is connected to the third data processing device C3 via another network, termed "Internet". Thus the fourth communication unit CU4 forms an access node or interface between the communication network N and the "Internet". The "Internet" may be any network for transmitting data between data processing devices and preferably employs packet switched transfer of information. As outlined earlier, packet switched transfer implies that each data packet is individually sent, possibly on an individual path, using header and recipient information contained in each packet. For packet switched transmission of information, communicating devices do not have to be connected directly, as opposed to circuit switched transmission, as it is preferably used by the communication network N.

The fourth communication unit CU4 is connected between said network node N2 and the "Internet" and transmit data packets between the first and the third data processing device C1, C3. The fourth communication unit CU4 is therefore responsible to receive data packets from the first data processing device C1 via the network node N2 and to send said data packets towards the third data processing device C3 via the "Internet" and vice versa. As before, said first and fourth temporary storage means S1 and S4 are provided for temporarily storing data packets scheduled for transmitted between the third data processing device C3 and the first data processing device C1.

In the following the operation of the arrangement shown in FIG. 2 is described.

If in the embodiment illustrated in FIG. 2 data packets are to be transmitted from the first communication unit CU1 towards the third data processing device C3, the steps essentially correspond to the steps performed for transmitting information between the first and second communication units CU1, CU2, as previously described with respect to FIG. 1. A description thereof is thus omitted.

In the following, a case of data transmission in the opposite direction is described. In this case data packets are transmitted from the third data processing device C3 to the first communication unit CU1.

First, a message generated at or received by the third data processing device C3 from another data processing device (not shown) is partitioned into a sequence of data packets, which are scheduled for transmission and sent via the "Internet" towards the first communication unit CU1 via the fourth communication unit CU4. It is assumed, that at the fourth communication unit CU4 said data packets sent by the third data processing device C3 are correctly received.

Next it is required to forward said data packets to the first communication unit CU1 via the communication network N. Therefore, the fourth communication unit CU4 performs the following steps. In a first step the received data packets are scheduled into a sequence for transmission to the first communication unit CU1, preferably by said transmission control means T4. In a second step said data packets are sent via the communication network N, as indicated by an arrow denoted S22. The data packets for transmission may also be temporarily stored in the fourth temporary storage means S4, as illustrated by an arrow denoted S21.

In a third step, as already described with respect to FIG. 1, it is determined at the fourth communication unit CU4, preferably by the fourth transmission control means T4, which data packets or which groups of data packets were lost or will be lost during transmission due to a temporary interruption of communication link via the communication network N, based on information received from the communication network, e.g. with said interrupt message IM.

In a fourth step, illustrated by an arrow denoted S23, said packets or said groups of packets are retransmitted, preferably by the transmission control means T4, at a later point in time, when the temporary interruption of the communication network N has ended. For a retransmission of lost packets, packets can be retrieved from said temporary storage means S4, connected to the fourth data processing device C4.

In another embodiment, as already described with respect to FIG. 1, upon reception of the interrupt message IM, the transmission of data packets may be temporarily interrupted until the temporary interruption of the communication network ended.

The actual transmission of data packets between said first communication unit CU1 and said data processing device C3 via the fourth communication unit CU4 is performed using rules defined in a set of protocols, preferably. As outlined before, one of these sets of protocols frequently used in communication networks and networks of data processing devices such as an "Internet" is the TCP/IP protocol suite. The TCP/IP protocol suite handles the partitioning of messages into data packets and the provision of headers with recipient and routing information to said packets and also handles the actual transmission of the data packets via the used network. The TCP/IP protocol suite contains various algorithms for congestion avoidance and flow control.

In an embodiment of invention rules or routines are included into the set of protocols used to control data transmission, e.g., the TCP/IP protocol set, and/or routines of the used set of protocols are adapted in correspondence with the invention. E.g., an amendment may be such that data packets scheduled for transmission at one of the communication units CU1, CU2 and CU4 are temporarily stored in a respective one of the temporary storage means S1, S2 and S4. Further, data packets determined to be lost during transmission due to a temporary interruption of the communication network, based on the information received from the communication network, are retransmitted at a later time after the connection via the communication network has been reestablished.

The protocols may also be amended, such that a transmission of packets is temporarily interrupted during the temporary interruption of the communication network, as described before.

Preferably the amendments performed are such, that data transmission is still possible between communication units, executing a standard set of protocols, which is amended according to the invention, and data processing devices, e.g., data processing device C3, executing a standard set of protocols which is not amended according to the invention. In other words, the amendments are preferably such that compatibility of protocols amended according to the invention and protocols not amended is maintained in all cases.

Preferably, said transmission control means T1, T2, T4 are be arranged to perform said modified or included routines of the TCP/IP protocol suite or any other protocol suite, whereas, e.g., data processing device C3 executes a not amended set of protocols.

In the following, with respect to FIG. 3, an embodiment of the communication method according to the invention is described.

Figure 3:
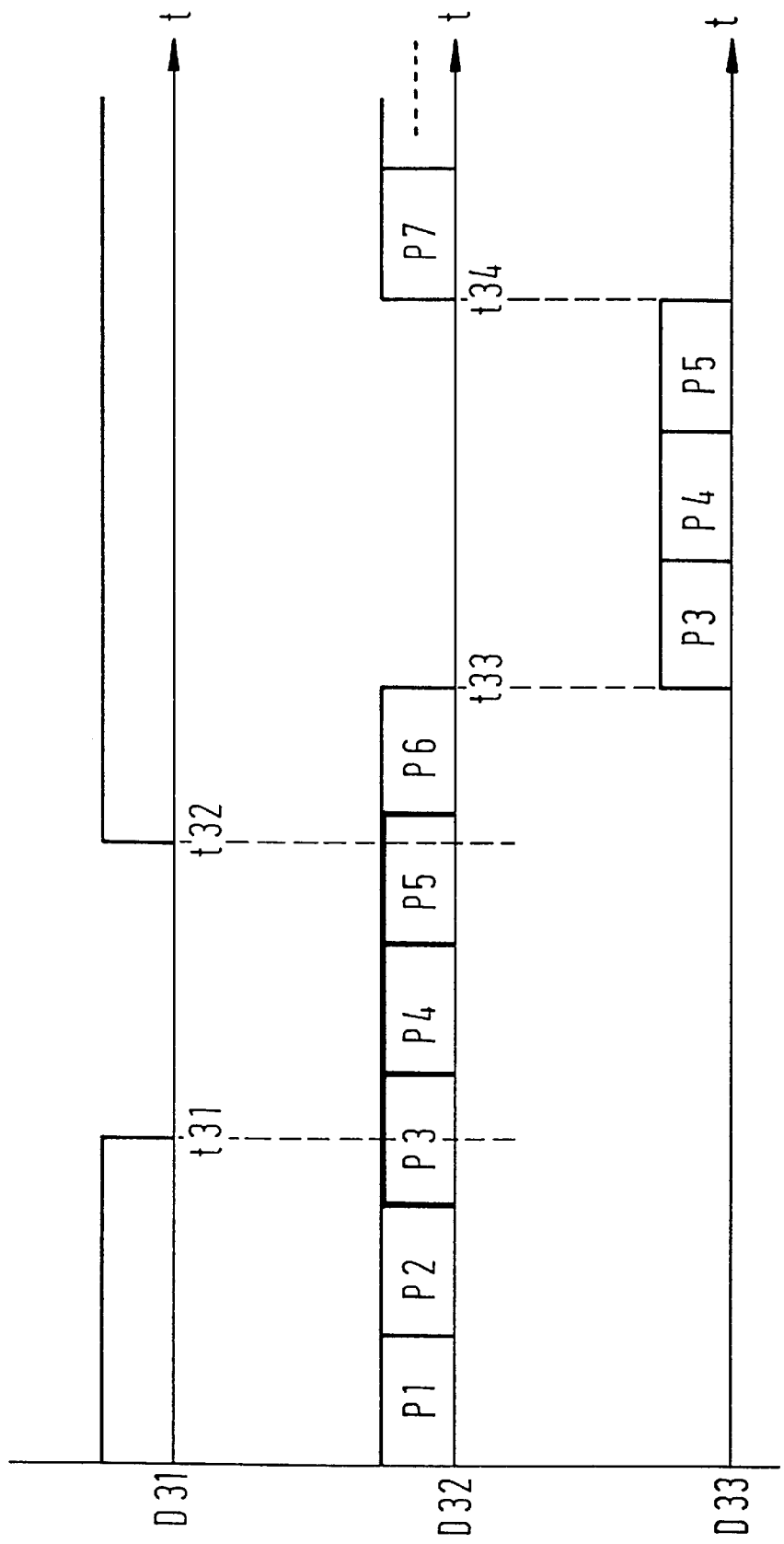
FIG. 3 shows a time diagram illustrating the transmission of data packets between data processing devices according an embodiment of the invention.

FIG. 3 shows a time diagram illustrating the transmission of data packets via a network which may comprise the communication network N or the communication network N and the "Internet" in the presence of temporary interruptions of the communication link for the transmission of data packets via the communication network N.

Illustrated at a first time axis D31 with the time t is the status of the communication link via the communication network N. In the case shown, the communication link is undisturbed from a time instant t30 to a time instant t31 but transmission via the communication network is interrupted between the time instant t31 and a time instant t32. After time instant t32 transmission via the communication network N is again undisturbed.

The second time axis, denoted D32, illustrates the transmission of data packets from the first communication unit CU1 towards the second communication unit CU2. The particular direction of transmission is assumed only for the sake of convenience, data transmission between other communication units or data processing devices may follow the same time sequence. Along the second time axis D32 the transmission of data packets P1 to P7 from the first data processing device C1 to the second data processing device C2 is illustrated.

Along a third time axis D33, a transmission of data packets lost during transmission via the communication link is illustrated, preferably executed by the first transmission control means T1 using the first temporary storage means S1. As mentioned before, the interruption of packet transmission or retransmission of data packets lost during a temporary interruption of the communication network may, for example, be handled by the suitably amended TCP/IP protocol suite or any other protocol suite, as outlined before.

In the following, the operation of the embodiment of the communication method according to the invention is described with respect to FIG. 3.

In a first step the sequence of data packets P1–P7, scheduled for transmission, is transmitted from data processing device C1 via the network towards the second data processing device C2. During the transmission of data packets P1 and P2 transmission via the communication network N is uninterrupted and said data packets P1 and P2 arrive at the second data processing device C2.

During the transmission of the data packet P3, however, at the time instant t31 a temporary interruption of transmission via the communication network occurs and said packet P3 will be at least partially lost. The data packet P4 is transmitted entirely within the time period of the temporary interruption of the communication network and is entirely lost. During the transmission of the data packet P5, at time instant t32, the communication network interruption ends and data packet P5 partially arrive at the data processing device C2. In the following, the data packet P6 is transmitted to the data processing device C2 without problems.

At some point in time (not indicated in FIG. 3) before a time instant t33, an interrupt message IM is issued by said communication network N, including time parameters concerning the temporary interruption of the communication network N. This message, as outlined in detail before with respect to FIG. 1 and FIG. 2, is processed preferably by said first transmission control means T1 in order to determine data packets or groups of data packets which are at least partially lost during transmission.

In the following, in a retransmission step all data packets, which were partially lost or entirely lost during transmission are retransmitted, preferably by said first i transmission control means T1 retrieving the packets from the temporary storage means S1. In the embodiment shown in FIG. 3, data packets P3, P4 and P5 were at least partially lost and thus, at the time instant t33, retransmission of data packets P3, P4 and P5 is performed, after data packet P6 has been sent. At a time instant t34 the transmission of data packets P3, P4 and P5 is completed, and regular transmission of data packets from data processing device C1, beginning with the data packet P7 is again started.

It is noted, that said retransmission of lost data packets can be performed at any time after the temporary interruption ended, not necessarily after a transmission of a particular data packet.

Figure 4:
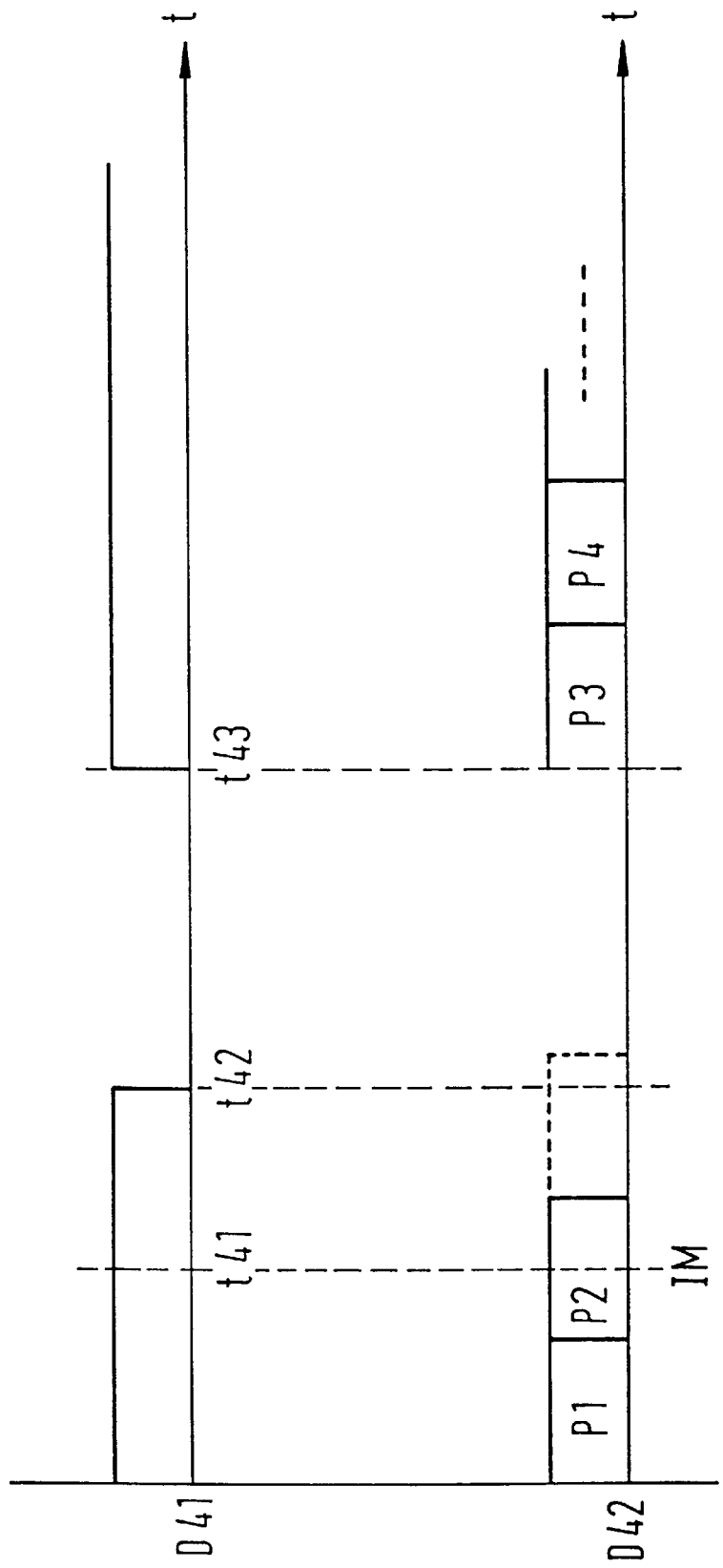
FIG. 4 shows a time diagram illustrating the transmission of data packets between data processing devices according another embodiment of the present invention.

In the following, another embodiment of the communication method according to the invention is described with respect to FIG. 4. FIG. 4 shows a time diagram illustrating the status of the communication network N and steps for transmission of data packets, again, as an example, from said first data processing device C1 towards said second data processing device C2.

A first time axis D41, as before time axis D31 with respect to FIG. 1 and FIG. 3, illustrates the status of the communication network N. Transmission of data packets via the communication network N is temporarily interrupted, now between time instants t42 and t43.

A second time axis D42 is used to illustrate a transmission of data packets P1–P4 from said first communication unit CU1 towards the second communication unit CU2. At a time instant t41 said interrupt message IM containing information concerning temporary interruption of the communication network is assumed to be received at the data processing device C1 and the first transmission control means T1, respectively.

In the following, steps for transmitting data packets from the first communication unit CU1 to the second communication unit CU2 are described with respect to FIG. 4.

As before, the actual transmission may be handled by the first transmission control means T1 using a set of protocols, e.g., a modified or amended TCP/IP protocol suite. First data packet P1 is transmitted. The communication network is uninterrupted and data packet P1 properly arrives at the second communication unit CU2. The same holds true for data packet P2, which will also be correctly received at the second communication unit CU2.

At time instant t41, however, during the transmission of the second data packet P2, said interrupt message IM containing interrupt information of the network, concerning a temporary interruption of transmission in the time period from t42 to t43 is received at the first communication unit CU1, which upon reception of the interrupt message IM temporarily interrupts the transmission of data packets, in the case shown, immediately after transmission of data packet P2, since it can be predicted, that data packet P3 and following data packets cannot be transmitted properly due to the temporary interruption of the communication link via the communication network N occurring at time instant t42.

The interrupt message IM, however, also contains information concerning the time when the transmission via the communication network can be reestablished. Therefore, at time instant t43 or any other point in time after time instant t43, the transmission of data packets is restarted beginning with data packet P3. It is understood, that a communication system for performing the communication method according to FIG. 4 does not necessarily require temporary storage means as previously described with respect to FIGS. 1, 2.

In the following another embodiment of the communication method according to the invention is described with respect to FIG. 5.

Figure 5:
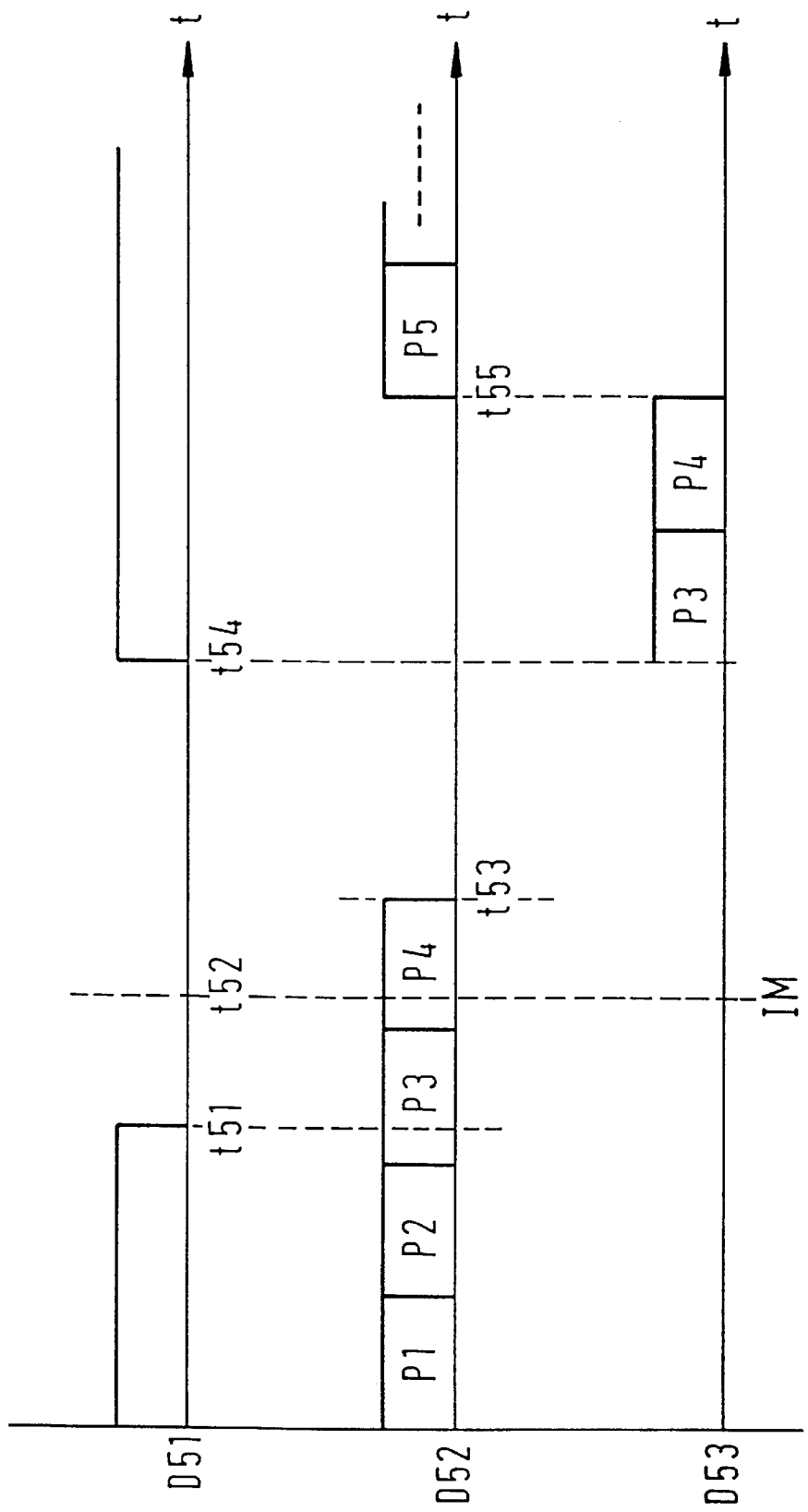
FIG. 5 illustrates a time diagram illustrating the transmission of data packets between data processing devices according another embodiment of the present invention.

In FIG. 5, a first time axis D51 denotes the status of the transmission of packets via a network, as before, including said communication network N. The transmission of data packets is interrupted between time instant t51 and time instant t54.

The transmission of data packets P1 to P5 is illustrated along a second time axis D52. For the sake of convenience, once again it is assumed that said first communication unit CU1 transmits data packets towards the second communication unit CU2.

A retransmission of data packets from the temporary storage means S1 is illustrated along a time axis D53.

In the following operating steps are described with respect to FIG. 5.

As before, data packets P1 and P2 are correctly transmitted and received at the second communication unit CU2. During a transmission of data packet P3, at time instant t51, however, transmission of packets via the communication network is temporarily interrupted and accordingly data packet P3 is at least partially lost. Data packet P4 is entirely lost during the temporary interruption of transmission via the communication network.

Following, at a time instant t52, the interrupt message IM is received at the first communication unit CU1 indicating the period of temporary interruption of the communication network from time instant t51 to time instant t54.

Therefore, in a next step, upon reception of the interrupt message IM at time instant t52, after the transmission of data packet P4, transmission of packets is temporarily interrupted at a time instant t53, since it is now known that transmission via said communication network N is temporarily interrupted.

In the following, after the temporary interruption of the communication network ends at time instant t54, lost data packets P3 and P4 are retransmitted using the temporary storage means S1. After complete transmission of data packets P3 and P4 from the temporary storage means S1, at a time instant t55, regular transmission of data packets from the first to the second data processing device C1, C2 is restarted, beginning with data packet P5.

The described embodiment only illustrates a possible time diagram of a sequence of events during the transmission of data packets upon the occurrence of an interrupt message and a temporary interruption of the communication network. Other sequences of events are possible, e.g., lost/partially lost data packets P3, P4 may be transmitted at a different point of time, e.g., after data packet P5. Also, transmission of data packets could be immediately interrupted upon reception of the interrupt message IM at time instant t52 such that the transmission of data packet P4 would be terminated.

Figure 6:
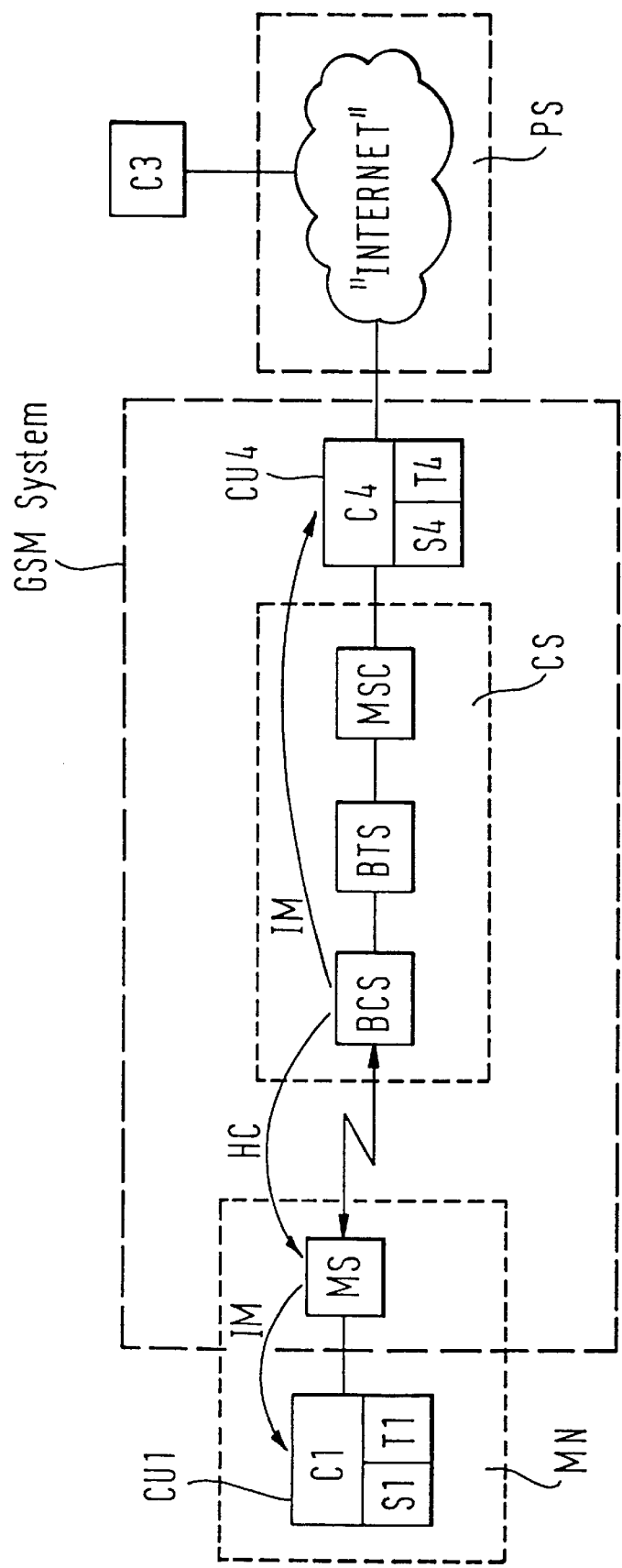
FIG. 6 illustrates an embodiment of the communication system according to the invention including a mobile communication network.
Figure 7:
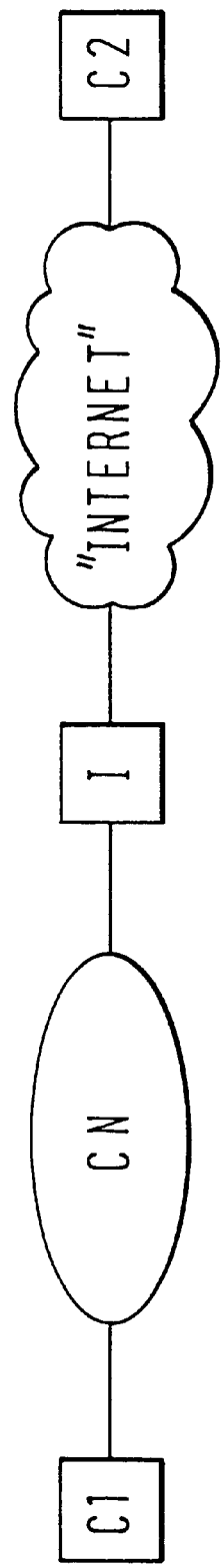
FIG. 7 shows a known communication system for data communication.

In the following, another embodiment of the communication system according to the invention is described with respect to FIG. 6. FIG. 6 illustrates a communication system according to the invention including a mobile communication network according to the GSM standard and an "Internet", however, it is noted that further embodiments may include alternate arrangements of networks.

In FIG. 6, the first data processing device C1 is again shown forming a first communication unit CU1 with the first temporary storage means S1 and the first transmission control means T1, arranged to transmit and receive data packets. Said first communication unit CU1 is connected to a mobile station MS, which may be a mobile telephone. The first communication unit CU1 and the mobile station MS together form a mobile node MN. The mobile node can, for example, be constituted by a laptop computer connected to a mobile telephone.

The mobile station MS is connected to a series connection of devices using circuit switched transmission for data packets, as illustrated by a box with broken lines denoted CS. Shown are a Base Station Controller BSC for establishing radio connections as well as a Base Transceiver Station BTS and a Mobile Switching Centre MSC for transmitting voice or data via transmission links. The above devices MS, BSC, BTS and MSC together form a network according to the GSM standard, as illustrated by a box with broken lines denoted GSM system.

The Mobile Switching Centre MSC is connected to the fourth communication unit CU4, again formed by said fourth data processing device C4, fourth transmission control means T4 and fourth temporary storage means S4. Said second unit constitutes a gateway to the "Internet" and therefore is responsible for transmitting data packets received via the GSM network to the "Internet" and vice versa. The "Internet" preferably performs packet switched transmission, as illustrated in FIG. 6 by a box with broken lines denoted PS.

Finally, a data processing device C3, recipient and sender of data packets is shown connected to the "Internet", as in FIG. 2.

During operation of the system, first communication unit CU1 sends data packets via the mobile station MS, the GSM network, the second communication unit CU2 and the "Internet" towards the third data processing device C3 and vice versa, the third data processing device C3 sends data packets to first communication unit CU1.

First, it is assumed that data packets are to be transmitted from first communication unit CU1 to the third data processing device C3. As already described with respect to FIG. 1, data packets are scheduled for transmission at first communication unit CU1 and sent via the network. At the same time, data packets scheduled for transmission may be stored in the temporary storage means S1.

Upon occurrence of a temporary interruption of the transmission of data packets via the GSM network, the mobile station MS transmits an interrupt message IM to the first communication unit CU1. A temporary interruption of transmission can, for example, occur when a handover procedure of a communication link between two devices of the mobile communication network is performed. The interrupt message IM sent may contain a time stamp indicating the current time, an execution time offset and an execution delay parameter. The execution time offset denotes a time period, beginning at the time instant indicated by the time stamp, after which the actual handover procedure will be executed. The execution delay parameter denotes the time delay of the execution of the handover procedure at a respective switching point of the GSM network, in the present case the mobile station, and may depend on the particular type of handover procedure performed.

The interrupt message IM may be transmitted from the mobile station MS to the first communication unit CU1 immediately upon reception of a handover command HC at the mobile station MS. The handover command HC is illustrated by an arrow denoted HC and indicates towards the mobile station MS that a handover has to take place. In the particular embodiment shown in FIG. 6, the handover command HC is transmitted from the Base Station Controller BSC to the mobile station MS, however, in other embodiments the handover command HC can also be issued by different units of the GSM network, e.g., the Base Transceiver Station BTS or the Mobile Switching Centre MSC.

Actions taken at the first communication unit CU1 upon reception of the interrupt message IM from the mobile station MS are the same as it was described previously, especially with respect to FIGS. 3, 4 and 5.

In the following, a case is described where data packets are transmitted from the third data processing device C3 towards the first communication unit CU1. In this case, data packets are transmitted via the "Internet" to the second communication unit CU2, constituting a gateway between the packet switched traffic of the "Internet" and the circuit switched traffic of the GSM system. At the second communication unit CU2, the data packets received may be stored in the fourth temporary storage means S4. In the following, the data packets received are scheduled for transmission towards the first data processing device C1 and sent via the mobile communication network.

Upon occurrence of a temporary interruption of data transmission via the mobile communication network some data packets will be lost, as described previously in detail. Which data packets will be lost or are lost during transmission due to the temporary interruption is determined at the second communication unit CU2, based upon the interrupt message IM received from the network.

Actions taken with respect to a retransmission or temporary interruption of a transmission of data packets towards the first data processing device C1 have been described with respect to FIGS. 3, 4 and 5 and are preferably executed by the transmission control means T4 in accordance with the modified or added rules of the set of protocols for data transmission via the network. In the example shown, the interrupt message IM is issued by the Base Station Controller BSC, however, the interrupt message IM can be issued by any other unit of the GSM-network.

What is claimed is:

1. A method for transmitting a plurality of data packets between at least two communication units via a communication network, the method including the steps of:
   a) scheduling said data packets into a sequence for transmission at a first communication unit of the at least two communication units, formed by a first data processing device and first transmission control means,
   b) sending said data packets to a second communication unit of the at least two communication units, via the communication network formed by a second processing device and a second transmission control means, wherein the at least two communication units use an amended standard protocol set for the transmission of data, causing a temporary storing of data packets or a temporary interruption of the transmission of data packets, while a compatibility to the standard protocol set is maintained;
   c) determining, at the first communication unit, which of said data packets will be lost during transmission due to future temporary interruption of the communication network based on information received from the communication network by which a time period of said temporary interruption is determined, and
   d) transmitting said data packets at a later time after the temporary interruption.

2. The method according to claim 1, wherein data packets scheduled for transmission are temporarily stored in a first temporary storage device.

3. The Communication method according to claim 1, wherein the communication network includes a mobile communication network.

4. The method according to claim 3, wherein the mobile communication network is a GSM network.

5. The method according to claim 1, wherein data packets transmitted from the first communication unit were previously received from a third data processing device, or data packets received at the second communication unit are transmitted to the third data processing device, wherein the transmission of data packets involves an Internet.

6. The method according to claim 1, wherein the TCP/IP protocol suite is used for the transmission of data by the at least two communication units (CU1, CU2, CU4) and a third data processing device, for the transmission of data by the communications units and the third data processing device (C3).

7. The method according to claim 1, wherein data packets are temporarily stored for a period of less than 3000 ms.

8. A method for transmitting a plurality of data packets between at least two communication units via a communication network (N), the method including the steps of:
   a) scheduling said data packets into a sequence for transmission at a first communication unit of the at least two communication units, formed by a first data processing device and a first transmission control means,
   b) sending said data packets to a second communication unit of the at least two communication units, formed by a second data processing device and a second transmission control means, via the communication network,
   c) determining, at the first communication unit, which data packets will be lost during transmission due to a temporary interruption of the communication network, based on information received from the communication network, including
   d) generating an interrupt message at a network node indicating a time period during which the communication link via the communication network is temporarily interrupted, receiving said interrupt message at the first communication unit;
   processing the interrupt message to determine data packets, which were transmitted or will be transmitted during said time period, wherein if the interrupt message is received at the first communication unit before the beginning of the time period of temporary interruption indicated in the interrupt message the transmission of the sequence of data packets is interrupted for said time period and continued after the end of said time period, and
   d) transmitting said data packets associated with said time period at a time after the time period indicated in the interrupt message.

9. The method according to claim 8, wherein data packets scheduled for transmission are temporarily stored in a first temporary storage device.

10. The method according to claim 8, wherein the interrupt message includes a time stamp, execution time offset and an execution delay parameter.

11. The method according to claim 8, wherein in case the interrupt message is received at the first communication unit within the time period of temporary interruption of the communication network, indicated in the interrupt message, the transmission of data packets is interrupted for the remainder of said time period and, after said time period ended, data packets which were sent during said time period are retransmitted and the transmission of the sequence of data packets is continued.

12. The method according to claim 8, wherein the communication network includes a mobile communication network.

13. The method according to claim 12, wherein the interrupt message is generated at a mobile station or a network node of the mobile communications network.

14. The method according to claim 13, wherein the mobile communication network is a Global System for Mobile Communications (GSM) network.

15. The method according to claim 14, wherein the interrupt message is sent at the same time as a handover command used in GSM systems for indicating that a handover procedure of a communication link has to take place.

16. The method according to claim 8, wherein data packets transmitted from the first communication unit were previously received from a third data processing device, or data packets received at the second communication unit are transmitted to the third data processing device, wherein the transmission of data packets involves an Internet.

17. The method according to claim 8, wherein a TCP/IP protocol suite is used for the transmission of data by the communication units and the data processing device.

18. The method according to claim 17, wherein the communication units use an amended standard protocol set for the transmission of data, causing a temporary storing of data packets or a temporary interruption of the transmission of data packets, while a compatibility to the standard protocol set is maintained.

19. The method according to claim 18, wherein data packets are temporarily stored for a period of less than 3000 ms.

20. A communication system, comprising:
   a first communication unit, formed a first by data processing device and first transmission control means,
   a second communication unit, formed by a second data processing device (C2 or C4 or C1) and second transmission control means,
   a communication network (N) for transmitting data partitioned into a plurality of data packets from said first communication unit to said second communication unit, interrupt message means for generating an interrupt message indicating a time period during which a transmission via the mobile communication network will be temporarily interrupted due to a handover procedure, and wherein said first transmission control means are arranged to determine data packets which will be lost during transmission, based on information received from the communication network, and transmits said data packets determined to be lost to the second communication unit at a later point in time.

21. The communication system according to claim 20, wherein the first communication unit comprises first temporary storage means for temporarily storing said plurality of data packets.

22. The communication system according to claim 20, wherein the communication network is a mobile communication network.

23. The communication system according to claim 20, wherein the mobile communication network is a GSM network.

24. The communication system according to claim 20, wherein the first communication unit or the second communication unit is connected between the communication network and an Internet for transmitting data packets to a third data processing device and receiving data packets from the third data processing device respectively.

25. The communication system according to claim 20, wherein the interrupt message means is a mobile station or a network node of the mobile communication network.

26. The communication system according to claim 20, wherein said first transmission control means are arranged to determine data packets which were lost during transmission, by ascertaining the beginning and ending of a period of time of said interruption.

* * * * *